US 6,640,825 B2

(12) United States Patent
McAtarian

(10) Patent No.: US 6,640,825 B2
(45) Date of Patent: Nov. 4, 2003

(54) LEAK AND SPILL CONTAINMENT BAG FOR TRANSFORMER VALVES

(75) Inventor: Patrick F. McAtarian, St. Mary's, KS (US)

(73) Assignee: Andax Environmental Corporation, Rutherford, NJ (US)

( * ) Notice: Subject to any disclaimer, the term of this patent is extended or adjusted under 35 U.S.C. 154(b) by 0 days.

(21) Appl. No.: 10/074,979

(22) Filed: Feb. 12, 2002

(65) Prior Publication Data

US 2003/0150489 A1 Aug. 14, 2003

(51) Int. Cl.⁷ .................... F16K 37/00; F16K 23/00
(52) U.S. Cl. ............... 137/312; 137/375; 137/551; 138/104; 141/86; 141/88; 141/94; 206/204; 222/108
(58) Field of Search .................. 137/312, 375, 137/551; 138/104; 141/86, 88, 94; 206/204; 222/108

(56) References Cited

U.S. PATENT DOCUMENTS

| 1,965,227 A | 7/1934 | Fiero |
| 2,250,980 A | 7/1941 | Workman et al. |
| 2,985,552 A | 5/1961 | Watanabe |
| 3,990,872 A | 11/1976 | Cullen |
| 4,556,082 A | 12/1985 | Riley et al. |
| 4,603,432 A | 7/1986 | Marino |
| 5,725,009 A | 3/1998 | Mallow, Sr. et al. |
| 5,865,223 A | 2/1999 | Cornford |
| 5,878,776 A | 3/1999 | Love |
| 6,039,066 A | * 3/2000 | Selby ................... 137/312 |
| 6,164,345 A | 12/2000 | Haddox |
| 6,244,290 B1 | 6/2001 | Reicin et al. |

FOREIGN PATENT DOCUMENTS

| DE | 2552508 | * 5/1977 | ........... 138/104 |
| DE | 2854016 | * 7/1980 | ........... 138/104 |

* cited by examiner

Primary Examiner—George L. Walton
(74) Attorney, Agent, or Firm—Hovey Williams LLP

(57) ABSTRACT

A leak identification and containment device (10, 48, 64) is provided which is designed for application to a valve assembly (12) including a conduit (16) and a valve (18) having an operating handle (20) and an outlet (22). The device (10, 48, 64) includes a flexible bag (24, 50, 66) formed of synthetic resin material which is at least translucent (and preferably substantially transparent) with a valve-receiving opening (30, 52) and an absorbent lining (34) on the inner surfaces of the bag (24, 50, 66). In use, the bag (24, 50, 66) is disposed over the valve assembly (12) including handle (20) and outlet (22) and a cinch strap (34, 54) is used to tighten the bag (24, 50, 66) about the conduit (16). The absorbent lining (34) is of a color which contrasts with that of material which may leak from the valve assembly (12), so that the device (10, 48, 64) gives a visual indication of leakage. In a preferred embodiment, the valve assembly extends from a transformer tank (10), the bag (24, 50, 66) is formed of substantially transparent reinforced polyethylene material, and the bag lining (34) is white in color.

34 Claims, 2 Drawing Sheets

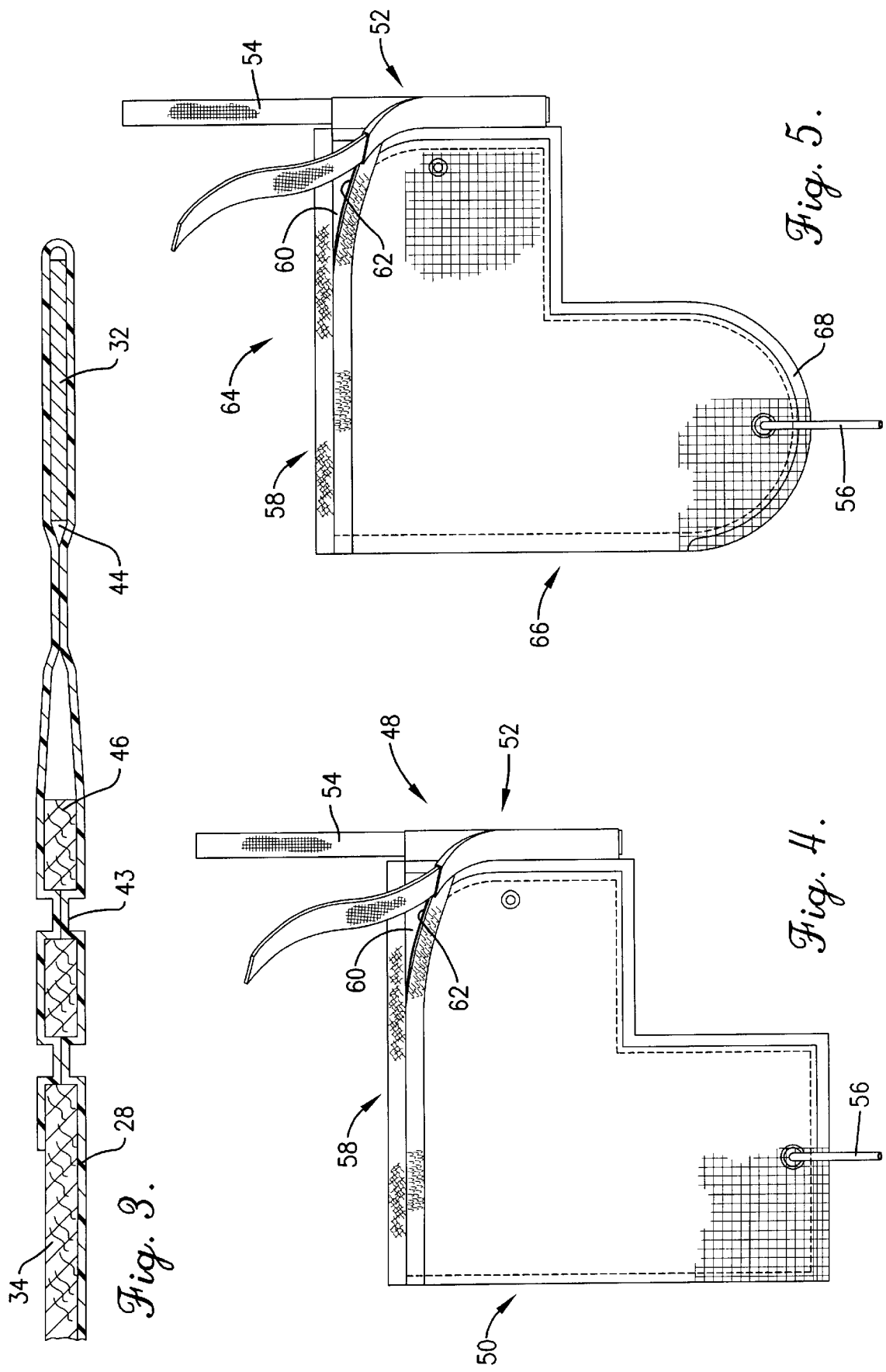

LEAK AND SPILL CONTAINMENT BAG FOR TRANSFORMER VALVES

BACKGROUND OF THE INVENTION

1. Field of the Invention

The present invention is broadly concerned with a leak identification and containment device adapted for application to a valve assembly which protrudes from a wall surface, such as a transformer tank valve. The identification and containment device includes a flexible bag formed of light-transmitting material having an internal absorbent lining and size to envelop the valve assembly. If a leak occurs, the lining becomes discolored, thereby giving an immediate visual indication of the leak.

2. Description of the Prior Art

Electrical substations normally have a series of large transformers, which are typically mounted above grade on pedestal structure. Such transformers include an oil tank as a part thereof, with the tank having a protruding drain valve. Transformer oil often contains polychlorinated biphenyls (PCBs) which are deemed to be environmentally hazardous. Over the course of time, transformer tank valves can develop leaks. Consequently, the transformer oil may spill on the ground adjacent the transformer site, causing ground pollution. While substation employees may periodically inspect the transformer tank valves for leaks, there may be substantial periods between the inspections. Therefore, considerable pollution can occur even though proper monitoring procedures are followed.

U.S. Pat. Nos. 4,556,082, 6,244,290 and 6,164,345 describe jackets designed for application to in-line valves and pipe fittings. Of necessity, such jackets must be specially designed for particular kinds of valves and line sizes. Moreover, they are generally formed as a unitary piece which is wrapped about an in-line valve and secured thereto. This creates seams in the valve enclosure which are subject to leaking. Further, these devices do not envelop and enclose the entire valve assembly, i.e., the operating handle of the valve extends outwardly from the jacket. Thus, any leaks which occur at the handle area of the valve are not contained. Finally, these jackets are not specifically designed to give a rapid visual indication of valve leakage by absorbing material escaping from a valve.

U.S. Pat. No. 5,878,776 illustrates an insulating jacket for protecting an exterior faucet against freeze-up in cold weather conditions, and is made up of a plurality of concentrically arranged plastic bags with insulating fill provided adjacent bags. A similar insulating unit is shown in U.S. Pat. No. 2,985,552. U.S. Pat. No. 5,725,009 discloses a device for containing and redirecting fluid released when a fitting is removed from the end of a pipe. These devices are not designed for long-term application to a valve assembly and provide no leak indicating function.

Finally, U.S. Pat. Nos. 1,965,227, 2,250,980 and 4,603,432 disclose miscellaneous absorbent and indicator packages, and collapsible spill containment assemblies. None of these patents deal with the specific problem of exterior valve leakage.

SUMMARY OF THE INVENTION

The present invention overcomes the problems outlined above and provides an improved leak identification and containment device adapted for application to a valve assembly protruding from a wall surface, there valve assembly including a conduit and a selectively operable valve having an operating handle and material outlet. A particular application for the devices of the invention is in the context of transformer tank valves, although the invention is not limited to this field of use. The identification and containment device includes a flexible bag formed of light-transmitting synthetic resin material which is at least translucent (and preferably substantially transparent) having a valve-receiving opening configured to receive the valve including the handle and outlet thereof, as well as a portion of the valve stem or conduit. A cinch strap is provided adjacent the open end of the bag and is operable to close the bag opening around the valve conduit to thereby fully enclose the valve including the handle and outlet. The bag includes an absorbent lining along at least a portion of the interior thereof adjacent the valve outlet. The lining has a color which will change in the event of leakage of material from the valve to allow visual determination of whether the valve is leaking.

The valve bag may be formed from a variety of flexible synthetic resin materials such as polyurethane, polyethylene, polyvinyl or polypropylene. The absorbent lining can likewise be fabricated from a large number of absorbent materials, although blown polypropylene is preferred. If desired, the bag may include additional features such as a drain fitting and/or a secondary access opening. The bag may be of virtually any shape so long as it may accommodate the entire valve assembly to be protected.

In use, the bag is opened and slid over the valve assembly including the handle and outlet, and the cinch strap is used to draw the bag opening around the valve conduit. In this manner, the entirety of the valve is within the confines of the bag. In the case of a transformer valve leak identification and containment device, it is preferred that the absorbent lining be white or light grey in color. Thus, if transformer oil begins to leak the lining is immediately darkened which can be easily observed. At the same time, the leakproof heat-sealed bag seams (which avoid folded-over sections which could allow leakage) contains the leaking transformer oil to prevent pollution.

BRIEF DESCRIPTION OF THE DRAWINGS

FIG. 3 is a sectional view taken along line 3—3 of FIG. 2, and further depicting the construction of the device;

FIG. 4 is an elevational view of another leak identification and containment device in accordance with the invention, having a somewhat L-shaped, square-bottom configuration and equipped with a secondary access opening and a drain fitting; and FIG. 5 is an elevational view similar to that of FIG. 5, and depicting a still further embodiment of the invention having a somewhat L-shaped, round-bottom configuration with a drain fitting.

DETAILED DESCRIPTION OF THE PREFERRED EMBODIMENT

Figure 1:
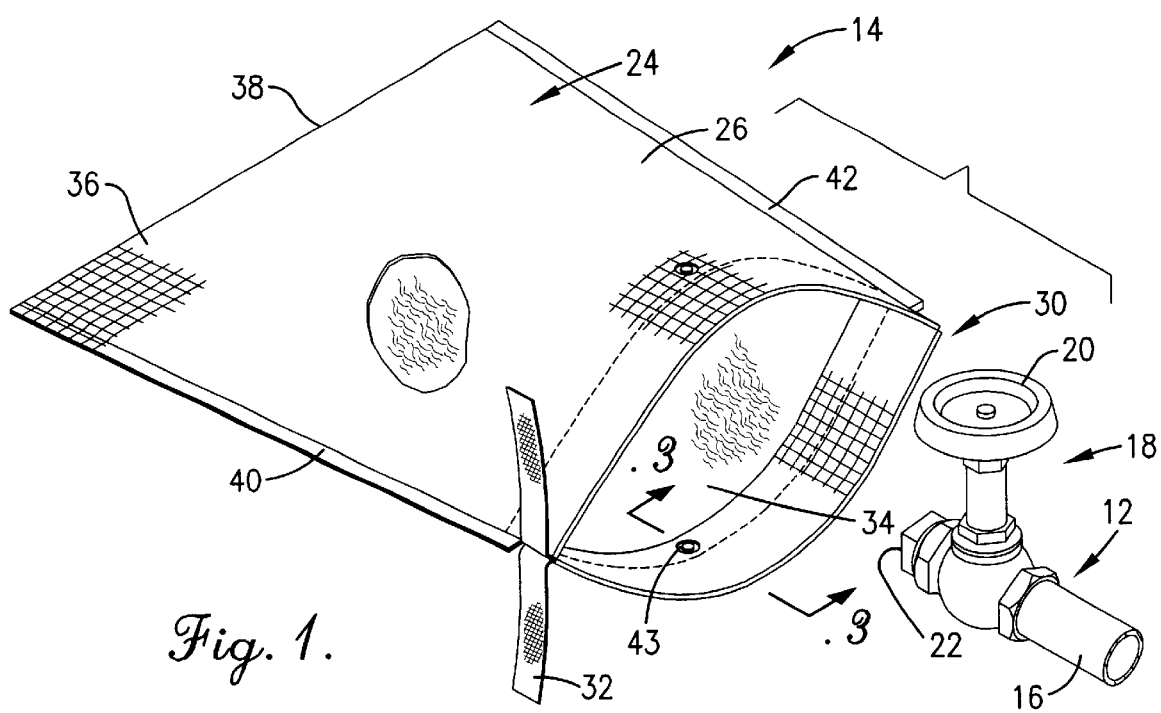
FIG. 1 is a perspective view of a transformer tank valve and the leak identification and containment device of the invention, shown during application of the device to the valve.
Figure 2:
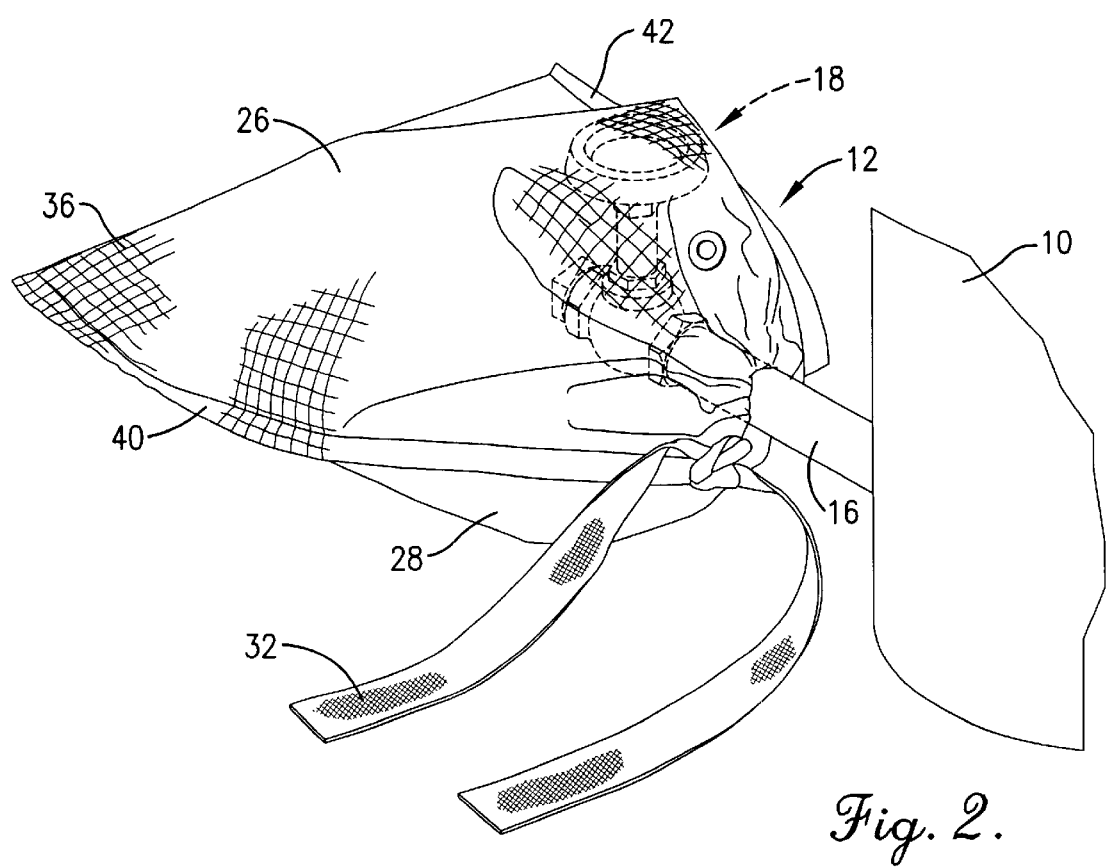
FIG. 2 is a perspective view similar to FIG. 1, but showing the device fully installed on the transformer valve.

Turning now to the drawings, FIGS. 1 and 2 illustrate a conventional transformer tank 10 having a valve assembly 12 protruding therefrom, together with a leak identification and containment device 14 designed for application to the valve 12 to facilitate identification of a leak from the valve assembly 12, while also containing leaking transformer oil or other material. The tank 10 and valve assembly 12 are entirely conventional, with the latter including a stem or conduit 16 protruding from tank 10, with a gate valve 18 coupled to the outer end of conduit 16 and including an operating handle 20 and material outlet 22.

The device 14 is in the form of a flexible bag 24 formed of synthetic resin material, presenting opposed bag wall sections 26 and 28, together with a valve-receiving opening 30. The overall device further includes a continuous, flexible synthetic resin cinch strap 32 adjacent opening 30. The inner surfaces of the wall sections 26, 28 are faced with an absorbent lining 34 which is important for purposes to be described.

In more detail, the illustrated bag 24 is formed of substantially transparent polyethylene material which has embedded therein a criss-cross pattern of polyester reinforcing cord 36. The polyethylene preferably has a thickness of from about 0.002–0.015 inches, and more preferably from about 0.004–0.008 inches. The specific bag material illustrated in FIGS. 1–2 has a thickness of about 0.006 inches and is somewhat thicker at the regions of the cord 36 (about 0.010 inch). In this embodiment, a continuous sheet of the bag wall material is provided which is faced with the lining 34; the sheet is then folded to present a bottom margin 38 and the valve-receiving opening 30. The side margins of the bag 24 are formed by heat sealing of the adjacent edges of the folded bag wall material, thereby defining closed side margins 40 and 42. Thus, the bag 24 is effectively integral in construction to prevent leakage during use.

The bag material is also folded at the opening 30 and sealed to itself as shown at 43 in FIG. 3, thereby defining an elongated, continuous passageway 44 extending about the opening 30. The cinch strap 32 extends through the passageway 40 with the tag ends thereof extending from the passageway.

The lining 34 is also preferably a continuous sheet which is secured at the locations 43 to the inner surface of the bag wall sections 26 and 28. As shown in FIG. 3, the folded portion of the bag wall material defining passageway 44 extends downwardly and covers the upper margin 46 of the lining 34. The preferred lining is an absorbent melt-blown polypropylene having a thickness of from about ⅛–½ inches, more preferably from about 3/16–⅜ inches. The lining 34 in this embodiment is white in color, and is readily visible through the substantially transparent polyethylene material used to form bag 24.

FIG. 2 illustrates the device 14 operatively disposed about valve assembly 12. In particular, the bag 24 is opened and slid over valve 18, including handle 20 and outlet 22, until the opening 30 surrounds conduit 16. At this point, the cinch strap 32 is utilized to draw the opening 30 into relatively tight engagement with the conduit 16, thereby fully enveloping the valve 18 and a portion of the conduit 16 within the bag 24. The device 24 can be maintained in this position virtually indefinitely in as much as the synthetic resin material used to form the bag is highly weather-resistant.

In the event that valve assembly 12 begins to leak, the dark transformer oil drops onto the white lining 34 and the latter is immediately darkened. Accordingly, the leaking condition of the valve assembly is immediately apparent, even to a casual observer. Moreover, the bag 24, owing to its strong construction, is able to hold a significant quantity of the leaking material, thus preventing pollution adjacent the transformer tank. Of course, as the bag 24 fills with leaked oil, it beings to expand, which again can be quickly noted so as to signal the need for valve assembly repair or replacement.

FIG. 4 illustrates another embodiment in accordance with the invention, in the form of a device 48 which is similar in many respects to device 14. However, in this instance, the device 48 includes a generally L-shaped, square bottom bag 50 having a valve-receiving opening 52. The opposed sidewalls of the bag 50 are formed of the same material described in connection with device 14, and likewise the inner surfaces of the bag sidewalls are faced with the same type of lining. Still further, the bag 50 has a cinch strap 54 disposed about opening 52. However, in this embodiment two additional features are present. First, the bag 50 has a selectively openable drain fitting 56 adjacent the bottom margin thereof, as well as a secondary access opening 58 along the top margin of the bag. In this case, the facing surfaces 60, 62 of the top margin of the bag are equipped with Velcro® hook and loop material so that the secondary opening may be closed while still providing a means for opening the bag as necessary.

FIG. 5 illustrates a device 64 which is very similar to the device 50 but incorporates a bag 66 of generally L-shaped configuration having a round bottom margin 68. As depicted, the device 66 has the same type of primary opening 52, cinch strap 54, drain fitting 56, secondary access opening 58 and Velcro® closures 60, 62.

The L-shaped bags 50 and 66 are typically employed where the valve to be protected includes a depending outlet. Further, once applied to such a valve, access to the operating handle thereof is permitted via the secondary openings 58. Thus, if it is desired to manipulate the enclosed valve, it is only necessary to open the secondary openings 58, which can then be reclosed via the Velcro® closures.

Although the embodiments of FIGS. 1–5 have been described as employing particular types of materials of construction and a white lining it will be appreciated that the invention is not so limited. Generally speaking, a variety of flexible material synthetic resin materials can be used to fabricate the valve-receiving bag, and similarly many types of absorbent lining can be employed. In terms of lining color, white is used because of the corresponding dark color of transformer oil. However, in more general terms, it is desirable to provide a lining having a color which will change in the event of leakage of material from a protected valve. For example, if such material is white or light in color, then the bag lining would be darker so that upon leakage of the material from the valve the dark-colored lining is lightened.

I claim:

1. A leak identification and containment device adapted for application to a valve assembly protruding from a wall surface, said valve assembly including a conduit extending from said wall surface and a selectively operable valve coupled with said conduit and having an operating handle and a material outlet, said device comprising a flexible bag formed of light-transmitting synthetic resin material which is at least translucent and having an opening configured to receive said valve including said handle and outlet, and a portion of said conduit, a cinch strap adjacent said open end operable to close said bag opening around said conduit to thereby fully enclose said valve including said handle and outlet and said conduit portion within the bag, and a solid absorbent lining bonded along at least a-portion of the interior of said bag adjacent said valve outlet, said lining having a color which will change in the event of leakage of material from the valve by virtue of absorption of said leaked material by the lining to allow visual determination of whether the valve is leaking.

2. The device of claim 1, said synthetic resin material being substantially transparent.

3. The device of claim 1, said lining comprising a light-colored material bonded to the interior surface of said synthetic resin material.

4. The device of claim 1, said lining being disposed substantially about the full interior surface of said bag.

5. The device of claim 1, said bag including an elongated passageway formed adjacent said opening, said cinch strap being disposed within and extending from the passageway.

6. The device of claim 1, said lining being white in color.

7. The device of claim 1, said synthetic resin material being polyethylene.

8. The device of claim 7, said polyethylene having a reinforcement of polyester cord.

9. The device of claim 1, said synthetic resin having a thickness of from about 0.002–0.015 inches.

10. The device of claim 1, said lining formed of polypropylene.

11. The device of claim 1, said lining having a thickness of from about ⅛–½ inches.

12. The device of claim 1, including a drain fitting secured to said bag to permit selective drainage of material therefrom.

13. The device of claim 1, including an access opening formed in said bag separate from said valve-receiving opening.

14. The device of claim 13, said access opening having a defining margin, said margin including complemental hook and loop material secured thereto for selective closure of the access opening.

15. The device of claim 1, said bag being generally L-shaped in configuration.

16. The device of claim 1, including a drain fitting secured to said bag.

17. The combination comprising:
   a valve assembly including a conduit extending from a wall surface and a selectively operable valve coupled with said conduit and having an operating handle and a material outlet; and
   a leak identification and containment device applied to said valve assembly, said device comprising a flexible bag formed of light-transmitting synthetic resin material which is at least translucent and having an opening receiving said valve including said handle and outlet, and a portion of said conduit, a cinch strap adjacent said open end operable to close said bag opening around said conduit to thereby fully enclose said valve including said handle and outlet and said conduit portion within the bag, and a solid absorbent lining bonded along at least a portion of the interior of said bag adjacent said valve outlet, said lining having a color which will change in the event of leakage of material from the valve by virtue of absorption of said leaked material by the lining to allow visual determination of whether the valve is leaking.

18. The combination of claim 15, said synthetic resin material being substantially transparent.

19. The combination of claim 15, said lining comprising a light-colored material bonded to the interior surface of said synthetic resin material.

20. The combination of claim 15, said lining being disposed substantially about the full interior surface of said bag.

21. The combination of claim 15, said bag including an elongated passageway formed adjacent said opening, said cinch strap being disposed within and extending from the passageway.

22. The combination of claim 15, said lining being white in color.

23. The combination of claim 15, said synthetic resin material being polyethylene.

24. The combination of claim 21, said polyethylene having a reinforcement of polyester cord.

25. The combination of claim 15, said synthetic resin having a thickness of from about 0.002–0.015 inches.

26. The combination of claim 15, said lining formed of polypropylene.

27. The combination of claim 15, said lining having a thickness of from about ⅛–½ inches.

28. The combination of claim 15, including a drain fitting secured to said bag to permit selective drainage of material therefrom.

29. The combination of claim 15, including an access opening formed in said bag separate from said valve-receiving opening.

30. The combination of claim 27, said access opening having a defining margin, said margin including complemental hook and loop material secured thereto for selective closure of the access opening.

31. The combination of claim 15, said valve being a transformer tank valve.

32. The combination of claim 15, said bag being generally L-shaped in configuration.

33. The combination of claim 15, including a drain fitting secured to said bag.

34. A leak identification and containment device adapted for application to a valve assembly protruding from a wall surface, said valve assembly including a conduit extending from said wall surface and a selectively operable valve coupled with said conduit and having an operating handle and a material outlet, said device comprising a flexible bag formed of light-transmitting synthetic resin material which is at least translucent and having an opening configured to receive said valve including said handle and outlet, and a portion of said conduit, a closure device adjacent said open end operable to close said bag opening around said conduit to thereby fully enclose said valve including said handle and outlet and said conduit portion within the bag, and a solid absorbent lining bonded along at least a portion of the interior of said bag adjacent said valve outlet, said lining having a color which will change in the event of leakage of material from the valve by virtue of absorption of said leaked material by the lining to allow visual determination of whether the valve is leaking.

* * * * *